US008839410B2

(12) United States Patent
Kerschbaum

(10) Patent No.: US 8,839,410 B2
(45) Date of Patent: Sep. 16, 2014

(54) TYPE-SYSTEM FOR MIXED PROTOCOL SECURE COMPUTATION

(71) Applicant: Florian Kerschbaum, Karlsruhe (DE)

(72) Inventor: Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 129 days.

(21) Appl. No.: 13/682,110

(22) Filed: Nov. 20, 2012

(65) Prior Publication Data

US 2014/0143764 A1 May 22, 2014

(51) Int. Cl.
*G06F 7/00* (2006.01)
*G06F 9/45* (2006.01)

(52) U.S. Cl.
CPC ........................................ *G06F 8/42* (2013.01)
USPC ............... 726/16; 380/28; 717/106; 717/143; 717/170; 726/26

(58) Field of Classification Search
USPC .......... 726/16, 26; 380/28; 717/106, 143, 170
See application file for complete search history.

(56) References Cited

U.S. PATENT DOCUMENTS

| 7,975,121 | B2 * | 7/2011 | Chen et al. ..................... 711/170 |
| 2003/0154468 | A1 * | 8/2003 | Gordon et al. ................. 717/143 |
| 2008/0046865 | A1 * | 2/2008 | Kerschbaum .................. 717/106 |
| 2009/0282208 | A1 * | 11/2009 | Chen et al. ..................... 711/170 |
| 2012/0121080 | A1 * | 5/2012 | Kerschbaum .................... 380/28 |
| 2014/0130173 | A1 * | 5/2014 | Kerschbaum .................... 726/26 |

OTHER PUBLICATIONS

Kerschbaum, "An Information-Flow Type System for Mixed Protocol Secure Computation," Proceedings of the ACM Symposium on Information, Computer and Communications Security, ASIA CCS'13, May 8-10, 2013, 12 pages.

Backes, et al., "Computationally Sound Abstraction and Verification of Secure Multi-party Computations," Proceedings of the 30th Conference on Foundations of Software Technology and Theoretical Computer Science, 2010, 61 pages.

Beaver et al., "The Round Complexity of Secure Protocols," Proceedings of the 22nd ACM Symposium on Theory of Computing, 1990, pp. 503-513.

Ben-David, "Fairplaymp—A System for Secure Multi-Party Computation," In CCS'08: Proceedings of the 15th ACM Conference on Computer and Communications Security, 2008, 10 pages.

Ben-Or, "Completeness Theorems for Non-Cryptographic Fault-Tolerant Distributed Computation," In STOC'88: Proceedings of the 20th ACM Symposium on Theory of Computing, 1988, 10 pages.

(Continued)

*Primary Examiner* — Beemnet Dada
*Assistant Examiner* — Sayed Beheshti Shirazi
(74) *Attorney, Agent, or Firm* — Fish & Richardson P.C.

(57) ABSTRACT

Implementations of the present disclosure are directed to for checking that a to-be-compiled program is well-typed such that the program is secure in a semi-honest model, and include actions of receiving the program, the program being provided in a human-readable, domain-specific programming language and including two or more protocols to provide secure computation based on inputs provided by two or more parties, processing the program in view of a type system to determine whether the program is secure in the semi-honest model, the type system including a secure type system extension provided as a set of typing rules that describe security types that can be assigned to one or more entities of the program, and compiling the program to generate a computer-executable program in response to determining that the program is secure in the semi-honest model.

15 Claims, 16 Drawing Sheets

(56) References Cited

OTHER PUBLICATIONS

Bogdanov et al., "Sharemind: a framework for fast privacy preserving computations," In ESORICS'08: Proceedings of the 13th European Symposium on Research in Computer Security, 2008, 15 pages.

Bogdanov et al., "Deploying secure multi-party computation for financial data analysis," In FC'12: Proceedings of the 16th International Conference on Financial Cryptography and Data Security, 2012, 8 pages.

Bogetoft et al., "Secure Multiparty Computation Goes Live," In FC'09: Proceedings of the 13th International Conference on Financial Cryptography and Data Security, 2009, 13 pages.

Catrina et al., "Fostering the Uptake of Secure Multiparty Computation in E-Commerce," Proceedings of the International Workshop on Frontiers in Availability, Reliability and Security, 2008, 8 pages.

Cramer et al., "General Secure Multi-Party Computation from any Linear Secret-Sharing Scheme," In EUROCRYPT'00: Proceedings of the 19th European Cryptology Conference, 2000, 19 pages.

Damg>rd et al., "Asynchronous Multiparty Computation: Theory and Implementation," In PKC'09: Proceedings of the 12th International Conference on Practice and Theory in Public Key Cryptography, 2009, 20 pages.

Denning, "A Lattice Model of Secure Information Flow," Communications of the ACM 19(5), 1976, 20 pages.

Denning, et al., "Certification of Programs for Secure Information Flow," Communications of the ACM 20(7), 1977, pp. 504-513.

Fournet, et al., "Information-Flow Types for Homomorphic Encryptions," Proceedings of the 18th ACM Conference on Computer and Communications Security, 2011, 10 pages.

Gentry, "Fully Homomorphic Encryption using Ideal Lattices."Proceedings of the 41st ACM Symposium on Theory of Computing, 2009, 10 pages.

Goethals, et al., "On Private Scalar Product Computation for Privacy-Preserving Data Mining," Proceedings of the 7th International Conference on Information Security and Cryptology, 2004, 17 pages.

Goldreich, "Secure Multi-party Computation," [online] http://www.wisdom.weizmann.ac.il/~oded/pp.html, Oct. 2002, 2 pages.

Goldwasser, "Multi-Party Computations: Past and Present," In PODC'97: Proceedings of the 16th ACM Symposium on Principles of Distributed Computing, 1997, 6 pages.

Goldwasser et al., "Probabilistic Encryption," Journal of Computer and Systems Science, vol. 28, No. 2, Apr. 1984, pp. 270-299.

Henecka et al., "TASTY: Tool for Automating Secure Two-partY computations," In CCS'10: Proceedings of the 17th ACM Conference on Computer and Communications Security, 2010, 16 pages.

Huang et al., "Faster Secure Two-Party Computation Using Garbled Circuits," In Proceedings of the 20th USENIX Security Symposium, 2011, 16 pages.

Ishai, et al., "Extending Oblivious Transfers Efficiently," Proceedings of CRYPTO, 2003, 17 pages.

Jensen et al., "Towards Privacy-Preserving XML Transformation," In ICWS'11: Proceedings of the 9th IEEE International Conference on Web Services, 2011, pp. 65-72.

Kerschbaum, "Automatically Optimizing Secure Computation," In CCS'11: Proceedings of the 18th ACM Conference on Computer and Communications Security, 2011, 11 pages.

Kerschbaum et al., "Secure Collaborative Supply Chain Management," IEEE Computer, 44(9), 2011, pp. 38 43.

Kerschbaum, et al., "RFID-based Supply Chain Partner Authentication and Key Agreement," In Proceedings of the 2nd ACM Conference on Wireless Network Security WiSec'09, Mar. 16-18 2009, 10 pages.

Kolesnikov et al., "From Dust to Dawn: Practically Efficient Two-Party Secure Function Evaluation Protocols and their Modular Design," Cryptology ePrint Archive: Report 2010/079, 2010, 2 pages.

Lampson, "A Note on the Confinement Problem," Communications of the ACM 16(10), 1973, 5 pages.

Lindell et al., "A Proof of Security of Yao's Protocol for Two-Party Computation," Journal of Cryptology, 22(2), Jun. 26, 2006, 25 pages.

Malkhi et al., "Fairplay—A Secure Two-Party Computation System," In Proceedings of the 13th USENIX Security Symposium, Feb. 1, 2004, 20 pages.

Myers, "JFlow: Practical Mostly-Static Information Flow Control," Proceedings of the 26th ACM Symposium on Principles of Programming Languages, Jan. 1999, 17 pages.

Naor, et al., "Efficient Oblivious Transfer Protocols," Proceedings of the Symposium on Data Structures and Algorithms, 2001, 10 pages.

Naccache, et al., "A New Public-Key Cryptosystem Based on Higher Residues," Proceedings of the ACM Conference on Computer and Communications Security, 1998, 8 pages.

Nielsen et al., "A Domain-Specific Programming Language for Secure Multiparty Computation," In PLAS'07: Proceedings of the ACM Workshop on Programming Languages and Analysis for Security, Jun. 14, 2007, pp. 21-30.

Paillier, "Public-Key Cryptosystems Based on Composite Degree Residuosity Classes," Proceedings of the International Conference on the Theory and Application of Cryptographic Techniques, Advances in Cryptology—EUROCRYPT '99, May 1999, Lecture Notes in Computer Science 1592, pp. 223-238.

Sabelfeld, et al., "Language-Based Information-Flow Security," IEEE Journal on Selected Areas in Communications, 21(1), Jan. 2003, 15 pages.

Schröpfer et al., "L1—An Intermediate Language for Mixed-Protocol Secure Computation," In COMPSAC'11: Proceedings of the 35th, IEEE Computer Software and Applications Conference, Jul. 2011, pp. 298-307.

Volpano, et al., "A Sound Type System for Secure Flow Analysis," Journal of Computer Security 4(3), 1996, 20 pages.

Yao, "Protocols for Secure Computations," In FOCS'82: Proceedings of the 23rd IEEE Symposium on Foundations of Computer Science, 1982, pp. 160-164.

* cited by examiner

Algorithm 1 Rerandomization Algorithm

```
function RERANDOMIZEUNIT(v, r)
    if INSTANCEOF(v, SecretShare) then
        return v − r
    end if
    if INSTANCEOF(v, PublicKeyCipherText) then
        return v · ENCRYPT(−r)
    end if
    if INSTANCEOF(v, PrivateKeyCipherText) then
        return v · ENCRYPT(0)
    end if
end function
function RERANDOMIZE(v, r)
    if ISTAINTED(r) then
        if INSTANCEOF(v, Array) then
            m ← GETMODULUS(v₁)
            r ← RANDOM(m)
            for all vᵢ ∈ v do
                vᵢ ← RERANDOMIZEUNIT(vᵢ, r)
            end for
            return v
        else
            m ← GETMODULUS(v)
            r ← RANDOM(m)
            return RERANDOMIZEUNIT(v, r)
        end if
    else
        if INSTANCEOF(v, Array) then
            for all vᵢ ∈ v do
                vᵢ ← RERANDOMIZEUNIT(vᵢ, r)
            end for
            r ← null
            return v
        else
            v′ ← RERANDOMIZEUNIT(v, r)
            r ← null
            return v′
        end if
    end if
end function
```

FIG. 2

$$\vdash u : \mathit{untainted} \quad (E-1)$$

$$\frac{\mathit{var} \neq u}{\vdash \mathit{var} : \mathit{tainted}} \quad (E-2)$$

$$\frac{\mathit{exp} \neq u}{\vdash \mathit{exp} : \mathit{tainted}} \quad (E-3)$$

$$\frac{\vdash \mathit{var}_1 : \mathit{untainted}}{[\mathit{sc}] \vdash \mathit{var}_1 = \mathbf{rerandomize}(\mathit{exp}, \mathit{var}_2)} \quad (R-1)$$

$$\frac{\vdash \mathit{var} : \mathit{untainted}}{[\mathit{sc}] \vdash \mathit{var} = \mathbf{output}(\mathit{exp})} \quad (R-2)$$

$$\frac{\vdash \mathit{var} : \mathit{untainted}}{[\mathit{untainted}] \vdash \mathbf{send}(\mathit{var})} \quad (M-1)$$

$$\frac{\vdash \mathit{var} : \mathit{tainted}}{[\mathit{untainted}] \vdash \mathit{var} = \mathbf{read}()} \quad (M-2)$$

$$\frac{\vdash \mathit{var} : \mathit{untainted}}{[\mathit{untainted}] \vdash \mathbf{otsend}(\mathit{var})} \quad (M-3)$$

$$\frac{\vdash \mathit{var} : \mathit{tainted}}{[\mathit{untainted}] \vdash \mathit{var} = \mathbf{otread}(\mathit{exp})} \quad (M-4)$$

$$\frac{\vdash \mathit{var} : \mathit{tainted}}{[\mathit{untainted}] \vdash \mathit{var} = \mathbf{gcencrypt}(\mathit{exp}, \ldots)} \quad (M-5)$$

$$\frac{\vdash \mathit{var} : \mathit{tainted}}{[\mathit{untainted}] \vdash \mathit{var} = \mathbf{gcdecrypt}(\mathit{exp}, \ldots)} \quad (M-6)$$

$$[\mathit{sc}] \vdash \mathbf{skip} \quad (C-1)$$

$$\frac{\vdash \mathit{var} : \mathit{tainted}}{[\mathit{sc}] \vdash \mathit{var} = \mathit{exp}} \quad (C-2)$$

$$\frac{[\mathit{tainted}] \vdash C_1 \quad [\mathit{tainted}] \vdash C_2}{[\mathit{sc}] \vdash \mathbf{if}\ \mathit{exp}\ \mathbf{then}\ C_1\ \mathbf{else}\ C_2} \quad (C-3)$$

$$\frac{[\mathit{sc}] \vdash C_1 \quad [\mathit{sc}] \vdash C_2}{[\mathit{sc}] \vdash C_1; C_2} \quad (C-4)$$

$$\frac{[\mathit{tainted}] \vdash C}{[\mathit{untainted}] \vdash C} \quad (C-5)$$

FIG. 3

```
1  int multiply (int s, int t) {
2    // key variables
3    1: prvk privKey;
4    pubk pubKey;
5
6    // read keys from hard disk
7    1: {
8      privKey = readKey("priv.key");
9      pubKey = getPublicKey(privKey);
10   }
11   2: pubKey = readKey("pub.key");
12
13   int n = getModulus(pubKey);
14   share<n> x, y, z;
15
16   // initialize shares
17   x = s;
18   y = t;
19
20   // declare ciphertexts
21   1: {
22     cipher<privKey> e, f, g;
23     cipher<privKey>* _e, _f;
24   }
25   2: {
26     cipher<pubKey> e, f, g;
27     cipher<pubKey>* _g;
28     share<n> r;
29   }
30
31   // send 1st message
32   1: {
33     e = encrypt(privKey, x);
34     f = encrypt(privKey, y);
35     _e = rerandomize(e, null);
36     _f = rerandomize(f, null);
37     send(2, _e, "E_A(x_A)");
38     send(2, _f, "E_A(y_A)");
39   }
40   // receive 1st message, send 2nd
41   2: {
42     e = read("E_A(x_A)");
43     f = read("E_A(y_A)");
44
45     g = modPow(e, y, n);
46     g *= modPow(f, x, n);
47     _g = rerandomize(g, r);
48     send(1, _g, "E_A(c)");
49   }
50   // receive 2nd message, compute result
51   1: {
52     g = read("E_A(c)");
53
54     z = decrypt(g) + x * y;
55   }
56   // also compute result at Bob
57   2: z = r + x * y;
58
59   return (int) z;
60 }
```

Listing 12: Example Secure Multiplication

*FIG. 4*

```
1  string substring (string x,
2                    share<n> s,
3                    share<n> t) {
4    string a, b, sub;
5
6    sub = rotate(x, s);
7    sub.len = t;
8    1: a = mask_send(sub);
9    2: a = mask_recv(sub);
10   1: b = mask_recv(sub);
11   2: b = mask_send(sub);
12
13   return add(a, b);
14 }
```

Listing 13: Example Composed Protocol
for Sub-string Creation

FIG. 5

```
1  // read keys from hard disk
2  prvk privKey;
3  pubk pubKey, pubKeyExt;
4
5  privKey = readKey("priv.key");
6  pubKey = getPublicKey(privKey);
7  pubKeyExt = readKey("pub.key");
8
9  const int n = 256;
10
11 if (getModulus(pubKey) != n)
12     exit(-1);
13
14 if (getModulus(pubKeyExt) != n)
15     exit(-1);
16
17 struct string {
18     share<n> len;
19     share<n> chars[n];
20 };
21
22 struct _string {
23     share<n>* len;
24     share<n>* chars[n];
25 };
26
27 struct string_pub {
28     cipher<pubKeyExt> len;
29     cipher<pubKeyExt> chars[n];
30 };
31
32 struct _string_pub {
33     cipher<pubKeyExt>* len;
34     cipher<pubKeyExt>* chars[n];
35 };
36
37 struct string_priv {
38     cipher<privKey> len;
39     cipher<privKey> chars[n];
40 };
41
42 struct _string_priv {
43     cipher<privKey>* len;
44     cipher<privKey>* chars[n];
45 };
```

Listing 18: Example Sub-string Type Definition

*FIG. 6*

```
1  string add (string x, string y) {
2      string z;
3
4      z = x;
5      z.len += y.len;
6      for (int i = 0; i < (int) n; i++)
7          z.chars[i] += y.chars[i];
8      return z;
9  }
10
11 string rotate_left (string x,
12                    share<n> s) {
13     string y;
14
15     y.len = x.len;
16     for (int i = 0; i < (int) n; i++)
17         y.chars[i] =
18             x.chars[(i + (int) s)%n];
19     return y;
20 }
21
22 string_pub rotate_left (string_pub x,
23                        share<n> s) {
24     string_pub y;
25
26     y.len = x.len;
27     for (int i = 0; i < (int) n; i++)
28         y.chars[i] =
29             x.chars[(i + (int) s)%n];
30     return y;
31 }
32
33 string rotate_right (string x,
34                     share<n> s) {
35     string y;
36
37     y.len = x.len;
38     for (int i = 0; i < (int) n; i++)
39         y.chars[i] =
40             x.chars[(i - (int) s + n)%n];
41     return y;
42 }
```

Listing 19: Example Helper Functions

FIG. 7

```
1   _string rerandomize_string (string x,
2                               string r) {
3     share<n> s;
4     _string _y;
5
6     _y.len = rerandomize(x.len, s);
7     r.len = s;
8     for (int i = 0; i < (int) n; i++) {
9       _y.chars[i] =
10          rerandomize(x.chars[i], s);
11      r.chars[i] = s;
12    }
13    return _y;
14  }
15
16  _string_pub rerandomize_string
17      (string_pub x,
18       string r) {
19    share<n> s;
20    _string_pub _y;
21
22    _y.len = rerandomize(x.len, s);
23    r.len = s;
24    for (int i = 0; i < (int) n; i++) {
25      _y.chars[i] =
26          rerandomize(x.chars[i], s);
27      r.chars[i] = s;
28    }
29    return _y;
30  }
31
32  _string_pub rerandomize_string
33      (string_pub x,
34       string _r) {
35    _string_pub _y;
36
37    _y.len = rerandomize(x.len, _r.len);
38    for (int i = 0; i < (int) n; i++)
39      _y.chars[i] =
40          rerandomize(x.chars[i],
41                      _r.chars[i]);
42    return _y;
43  }
```

Listing 20: Example Re-Randomization

*FIG. 8*

```
1  _string_priv encrypt_string (string x) {
2      string_priv y;
3      _string_priv _y;
4
5      y.len = encrypt(privKey, x.len);
6      _y.len = rerandomize(y.len, null);
7      for (int i = 0; i < (int) n; i++) {
8          y.chars[i] =
9              encrypt(privKey, x.chars[i]);
10         _y.chars[i] =
11             rerandomize(y.chars[i], null);
12     }
13     return _y;
14 }
15
16 string decrypt_string (string_priv e) {
17     string x;
18
19     x.len = decrypt(e.len);
20     for (int i = 0; i < (int) n; i++)
21         x.chars[i] = decrypt(e.chars[i]);
22     return x;
23 }
```

Listing 20: Example Encryption and Decryption

*FIG. 9*

```
1  void send_string (String mid,
2                    _string_priv _e) {
3      send((id()%2)+1, mid + "_len", _e.len);
4      // this loop is constant and
5      // automatically unrolled
6      for (int i = 0; i < (int) n; i++)
7          send((id()%2)+1, mid + "_" + i,
8                _e.chars[i]);
9  }
10
11 void send_string (String mid,
12                   _string_pub _e) {
13     send((id()%2)+1, mid + "_len", _e.len);
14     // this loop is constant and
15     // automatically unrolled
16     for (int i = 0; i < (int) n; i++)
17         send((id()%2)+1, mid + "_" + i,
18               _e.chars[i]);
19 }
20
21 void send_string (String mid,
22                   _string _x) {
23     send((id()%2)+1, mid + "_len", _x.len);
24     // this loop is constant and
25     // automatically unrolled
26     for (int i = 0; i < (int) n; i++)
27         send((id()%2)+1, mid + "_" + i,
28               _x.chars[i]);
29 }
30
31 string_pub recv_string_pub (String mid) {
32     string_pub y;
33
34     y.len = read(mid + "_len");
35     // this loop is constant and
36     // automatically unrolled
37     for (int i = 0; i < (int) n; i++)
38         y.chars[i] = read(mid + "_" + i);
39     return y;
40 }
41
42 string_pub recv_string_priv (String mid) {
43     string_priv y;
44
45     y.len = read(mid + "_len");
46     // this loop is constant and
47     // automatically unrolled
48     for (int i = 0; i < (int) n; i++)
49         y.chars[i] = read(mid + "_" + i);
50     return y;
51 }
52
53 string recv_string (String mid) {
54     string y;
55
56     y.len = read(mid + "_len");
57     // this loop is constant and
58     // automatically unrolled
59     for (int i = 0; i < (int) n; i++)
60         y.chars[i] = read(mid + "_" + i);
61     return y;
62 }
```

Listing 22: Example Message Sending

FIG. 10

```
1  string rotate (share<n> s, string in) {
2    string x, r;
3    _string _x;
4    string_priv e;
5    _string_priv _e;
6    string_pub y;
7    _string_pub _y;
8
9    x = in;
10   1:{
11     _x = rerandomize_shift(x, s);
12     _e = encrypt_string(x);
13     send_string("1", _e);
14   }
15   2:{
16     y = recv_string_pub("1");
17     rotate_left(y, s);
18     _y = rerandomize_string(y, r);
19     rotate_right(r, s);
20     x = add(x, r);
21     send_string("2", _y);
22     _e = encrypt_string(x);
23     send_string("3", _e);
24   }
25   1:{
26     e = recv_string_priv("2");
27     x = decrypt_string(e);
28     rotate_left(x, s);
29     y = recv_string_pub("3");
30     rotate_left(y, s);
31     _y = rerandomize_string(y, _x);
32     send_string("4", _y);
33   }
34   2:{
35     e = recv_string_priv("4");
36     x = decrypt_string(e);
37     rotate_left(x, s);
38   }
39
40   return x;
41 }
```

Listing 14: Example Rotation

*FIG. 11*

```
1  _string rerandomize_shift (string x,
2                             share<n> s) {
3      _string _x;
4      string r;
5
6      x = rotate_right(x, s);
7      _x = rerandomize_string(x, r);
8      x = r;
9      x = rotate_left(x, s);
10     return _x;
11 }
```

Listing 15: Example Initial Re-randomization

FIG. 12

```
1  string mask_send (string x) {
2     share<2> b;
3     string m, y, r;
4     _string _y;
5     string_priv e;
6     _string_priv _e;
7
8     m.len = n;
9     for (int i = 0; i < n; i++)
10        if (i < x.len)
11           m.chars[i] = 1;
12        else
13           m.chars[i] = 0;
14    _e = encrypt_string(m);
15    send_string("5", _e);
16    b = gcdecrypt("compare",
17                  (int) x.len, 0);
18    e = otread("6", (int) b);
19    y = decrypt_string(e);
20    _y = rerandomize_string(y, r);
21    send_string("7", _y);
22    return r;
23 }
```

Listing 16: Example Masking Sender

*FIG. 13*

```
1  string mask_recv (string x) {
2      share<2> b;
3      string r, q;
4      string_pub y, e, f[2];
5      string_pub _f*[2];
6
7      y = recv_string("5");
8      f[0].len = x.len;
9      f[1].len = x.len;
10     for (int i = 0; i < x.len; i++)
11         f[0].chars[i] =
12             encrypt(pubKeyExt, 1);
13     for (int i = x.len; i < n; i++)
14         f[0].chars[i] =
15             y.chars[i - x.len];
16     for (int i = 0; i < n - x.len; i++)
17         f[1].chars[i] =
18             y.chars[i + n - x.len];
19     for (int i = n - x.len;
20          i < n - x.len; i++)
21         f[1].chars[i] =
22             encrypt(pubKeyExt, 0);
23     for (int i = 0; i < n; i++)
24         e.chars[i] =
25             f[0].chars[i] * f[0].chars[i];
26     for (int i = 0; i < n; i++) {
27         f[0].chars[i] =
28             modPow(e.chars[i],
29                 (int) x.chars[i]);
30         f[1].chars[i] =
31             e.chars[i] *
32             encrypt(pubKeyExt, n-1);
33         f[1].chars[i] =
34             modPow(f[1].chars[i],
35                 (int) x.chars[i]);
36     }
37     b = gencrypt(
38         "bool compare(int x, int y) {
39             compare = x < y;
40         }",
41         (int) x.len, n);
42     if (b == 1) {
43         e = f[0];
44         f[0] = f[1];
45         f[1] = e;
46     }
47     _f = rerandomize(f, r);
48     otsend(_f);
49     q = recv_string("7");
50     q = add(q, r);
51     return q;
52 }
```

Listing 16: Example Masking Receiver

*FIG. 14*

TYPE-SYSTEM FOR MIXED PROTOCOL SECURE COMPUTATION

BACKGROUND

Secure two-party computation enables two parties to compute a function f over their joint, private inputs x and y, respectively. Neither party can infer anything about the other party's input (e.g., y) except what can be inferred from one's own input (e.g., x) and the of the computation output (e.g., f(x, y)).

Secure computation has many applications (e.g., in the financial sector) and has been successfully deployed in commercial and industrial settings. Secure computation protocols, however, are notoriously difficult to implement. For example, secure computation protocols can encompass arbitrary functionality in the joint computation. As another example, secure computation protocols follow a rigorous approach to security. In some instances, special protocols (e.g., mixing several different primitives) are developed for important problems. This is expected to provide more efficient protocols due to insight into the problem domain. Such special protocols, however, can require a manual verification and security proof resulting in inefficiencies in practice.

Current domain-specific programming languages (DSPLs) for secure computation do not adequately address these problems. More particularly, DSPLs are either tied to a specific protocol or enable implementing insecure protocols. On the one hand, if a DSPL is tied to a specific protocol, then the protocol may be manually proven secure independent of the functionality. Such a proof extends to all protocols implemented in the particular DSPL, but the DSPL prevents implementing many special, possibly more efficient protocols. On the other hand, if the DSPL is built upon a generic programming language (e.g., Python, Java), all special protocols can be implemented. However, this still allows the programmer to also implement insecure protocols that do not withstand security verification.

SUMMARY

Implementations of the present disclosure include methods for checking that a to-be-compiled program is well-typed such that the program is secure in a semi-honest model. In some implementations, methods include actions of receiving the program, the program being provided in a human-readable, domain-specific programming language and including two or more protocols to provide secure computation based on inputs provided by two or more parties, processing the program in view of a type system to determine whether the program is secure in the semi-honest model, the type system including a secure type system extension provided as a set of typing rules that describe security types that can be assigned to one or more entities of the program, and compiling the program to generate a computer-executable program in response to determining that the program is secure in the semi-honest model.

In some implementations, each entity includes one of a variable and an expression.

In some implementations, the security type system extends functionality of the type system to ensure that execution of the computer-executable program is secure.

In some implementations, processing the program includes assigning a type and a security type to each entity provided in the program.

In some implementations, the security types comprise tainted and untainted, and an untainted entity is provided as an immutable object that contains random data that is independent of any other untainted entity.

In some implementations, an untainted entity can be used in one of a send command and a re-randomization command of the program and is cleared after use.

In some implementations, each typing rule is provided as an inference rule that describes how a security type is assigned to an entity.

In some implementations, the set of typing rules provides that a particular variable is untainted and that all other variables and expressions are tainted.

In some implementations, the set of typing rules ensure that untainted variables can only be assigned by re-randomization and output statements of the program.

In some implementations, the set of typing rules ensure that message sending commands of the program can only be executed in an untainted security context.

In some implementations, the program implements one or more functions, and processing the program ensures that execution of each function of the one or more functions is secure in the semi-honest model.

In some implementations, a protocol of the program computes a function based on a plurality of inputs and is secure in the semi-honest model, if, for each party of the two or more parties, a polynomial-time simulator is provided that, given one party's input and a resulting output of the program, is computationally indistinguishable from another party's view.

In some implementations, the type system associates data types to each value that is to be computed in the program and ensures that the program provides no type errors.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

FIG. 2 depicts an example re-randomization algorithm in accordance with implementations of the present disclosure.

FIG. 3 depicts example security typing rules in accordance with implementations of the present disclosure.

FIGS. 4-14 depict example listings in accordance with implementations of the present disclosure.

Like reference symbols in the various drawings indicate like elements.

DETAILED DESCRIPTION

Implementations of the present disclosure are generally directed to a security type system that enables mixing protocol primitives in a generic programming language, while ensuring that well-typed programs are secure in the semi-honest model. More particularly, implementations of the present disclosure provide a security type system for mixed protocol secure computation, integration of the security type system into a domain-specific programming language (DSPL) extension for secure computation, proof that any well-typed program is secure in the semi-honest model, and an evaluation using example protocols (e.g., for multiplication and substring creation).

In general, and as discussed in further detail herein, implementations of the present disclosure ensure semi-honest security of secure computations implemented in domain-specific languages. In some examples, either the language is based on a specific protocol which has been proven secure or is based on a generic language that enables use of insecure protocols. Implementations of the type system of the present disclosure limit the usable protocols to only secure protocols, while enabling programmers to freely choose the protocol primitives. In accordance with implementations complex protocols can be used (e.g., privacy-preserving string processing).

Figure 1:
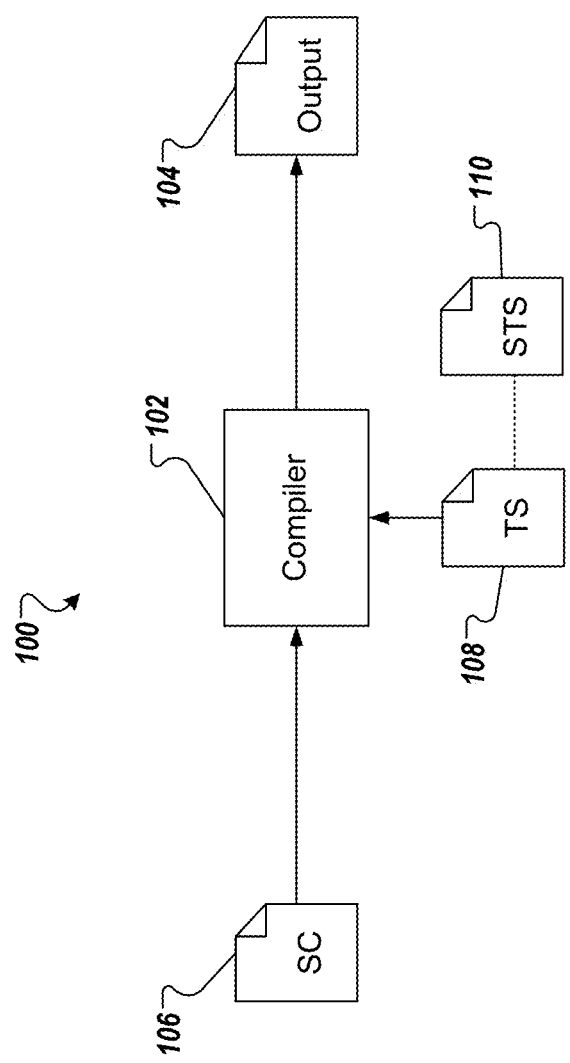
FIG. 1 depicts example compilation in accordance with implementations of the present disclosure.

FIG. 1 depicts example compilation 100 in accordance with implementations of the present disclosure. More particularly, FIG. 1 depicts an example compiler 102 for generating an output 104 from human-readable source code (SC) 106 in accordance with implementations of the present disclosure. The example compiler 102 transforms the source code 106 into the output 104. In some examples, the compiler 102 is provided as one or more computer-executable programs that can be executed using one or more computing devices. In some examples, the source code 106 is provided as a computer-readable document that can be processed by the compiler 102. In some examples, the source code 104 is provided in a human-readable (human-writable) DSPL. In some examples, the output 104 is provided as a computer-readable document that can be executed by one or more computing devices to provide defined functionality (e.g., secure computation). In some examples, the output 104 is provided in a machine-readable format (e.g., object code) to define a computer-executable program.

In some implementations, the compiler 102 processes the source code 104 based on a type system (TS) 108. In general, type systems associate data types to each value that is to be computed based on source code (e.g., the source code 104) and examines the data flow to ensure that the source code provides no type errors. In some examples, type errors can include mismatches between data types that can result in execution of unintended functionality and/or that can hinder execution of intended functionality.

In accordance with implementations of the present disclosure, a security type system (STS) 110 is provided. In some examples, the STS 110 can extend functionality of the type system 108 to ensure that execution of the resulting output 104 (e.g., as a computer-executable program) is secure, as discussed in further detail herein.

In some implementations, an example DSPL includes a generic programming language that is extended to be domain-specific. Such DSPLs enable the user of efficient protocols, but also do not guarantee against the programmer making mistakes and.or implementing insecure protocols. An example DSPL includes the L1 language, which provides an extension for secure computation based on Java. The L1 language enables mixing of several different protocol primitives. It is appreciated, however, that the L1 language is provided herein as an example DSPL and that implementations of the present disclosure can also be realized using other DSPLs. More particularly, implementations of the present disclosure can be adapted for any DSPL that allows mixing protocols and that is not tied to a particular protocol.

In some implementations, the DSPL is augmented with a security type system (e.g., the security type system 110 of FIG. 1). In accordance with the present disclosure, the security type system provably ensures that well-typed programs are secure in the semi-honest model of secure computation. In some examples, in the semi-honest model, each party follows the protocol description. Each party, however, can keep a record of the interaction and might try to infer additional information about the other party's input. Protocols secure in the semi-honest model provably prevent any such inference. In accordance with the present disclosure, the compiler (e.g., the compiler 102 of FIG. 1) statically verifies the security of the protocol during compilation by using the secure type system. Only secure protocols are compiled, and the programmer is immediately notified about potential security violations.

As discussed in further detail herein, the security type system can be evaluated for a DSPL (e.g., the L1 language) using examples. One example is provided as a simple multiplication protocol, and another example is provided as a complex protocol for privacy-preserving string processing. The complex protocol example shows that even such protocols—using a wide variety of protocol primitives in intricate ways—can be effectively implemented in the security type system.

In general, supporting security in a programming language using a type system has been applied to information flow security. Information flow is concerned with confidentiality breaches between principals in computer systems. Although information flow types have been applied to homomorphic encryption, the information flow types do not cover secure computations using homomorphic encryption. This is because all secure computations involve admissible information flows. Consequently, the basic typing assumption of non-interference does not hold in secure computation. Accordingly, the security type system of the present disclosure caters for more complicated use cases, as discussed in further detail herein.

In accordance with implementations of the present disclosure, secure computation is implemented using the primitives of homomorphic encryption. Example primitives include secret sharing, garbled circuits and oblivious transfer. In some examples, the primitives can be combined in many ways and could result in an insecure protocol. Each of the example primitives is discussed in further detail below with reference to two-party secure computation. It is appreciated, however, that implementations of the present disclosure can be applied to secure computation between two or more parties.

In some implementations, secure computation can be implemented based on additively homomorphic encryption. On the one hand, and as opposed to fully homomorphic encryption, additively homomorphic encryption only implements addition (modulo a key-dependent constant) as the homomorphic operation. On the other hand, additively homomorphic encryption is as fast as standard public-key cryptography.

As an example, $E_x(x)$ can denote the encryption of plaintext x encrypted using the public key of a party X (e.g., Alice (A) or Bob (B)), and $D_X(c)$ denotes the corresponding decryption of ciphertext c. Using this example, homomorphism can be expressed based on the following example relationship:

$$D_X(E_X(x) \cdot E_X(y)) = x+y$$

Accordingly, the following property can be derived:

$$D_X(E_X(x)^y) = xy$$

In some implementations, Paillier's encryption system is used. It is appreciated, however, that implementations of the present disclosure also support other encryption systems (e.g., Naccache-Stern) and allow the programmer to extend the available encryption systems. It can be noted that Paillier's and Naccache-Stern's encryption systems are not only public-key, but also secure against chosen plaintext attacks (e.g., indistinguishable under chosen plaintext attack (IND-CPA)). This semantic security implies that two different ciphertexts (even of the same plaintext) cannot be distinguished without the private key. In some examples, in secure computation based on homomorphic encryption, it can be sufficient to use one key per party.

In some examples, to implement the full functionality of secure computation, homomorphic encryption can be augmented with secret sharing. In some examples, each variable is secretly shared between parties (e.g., Alice (A) and Bob (B)). For example, x can be a variable that is secretly shared and p can be the modulus of the homomorphic encryption. Accordingly, Alice has $x_A$ and Bob has $x_B$, such that the following example relationship can be provided:

$$x = x_A + x_B \bmod p$$

The use of secret sharing and homomorphic encryption to implement any functionality in secure computation is discussed in further detail below. It is appreciated that combinations of homomorphic encryption and secret sharing can be already insecure (e.g., by revealing dependent shares). In order to implement any ideal functionality it suffices to implement addition and multiplication. In some examples, addition (e.g., addition of $x=x_A+x_B$ and $y=y_A+y_B$, of the same bit-length l) can be implemented locally by addition of each party's shares.

In some examples, multiplication (e.g., $z=x \cdot y$) can be implemented as a protocol. As an example, r can be a uniformly random number in $\mathbb{Z}_p$. An example multiplication protocol can be provided as:

$$A \rightarrow B E_A(x_A), E_A(y_A)$$

$$B \rightarrow A E_A(c) = E_A(x_A)^{y_B} E_A(y_A)^{x_B} E_A(r)$$

$$A z_A = x_A y_A + c \bmod p$$

$$B z_B = x_B y_B - r \bmod p$$

where the arrow ($\rightarrow$) denotes a transfer of information between parties. Using the example multiplication protocol, it can be verified that:

$$z_A + z_B = (x_A + x_B)(y_A + y_B)$$

In some examples, oblivious transfer (OT) is a protocol between a sender and a receiver. As input the sender has n messages $x_0, \ldots, x_{n-1}$ and the receiver has an index i ($0 \le i \le n$). Upon execution of the protocol, the receiver obtains $x_i$ as output. A secure OT protocol ensures that the sender has not learnt i and the receiver has learnt nothing about the other messages $x_j$, ($j \ne i$).

In accordance with implementations of the present disclosure, the OT protocol can be used as a primitive in mixed secure computations. In some examples, the OT protocol facilitates a distributed "if" statement, where one party has the results of the branches and the other party the condition. In some examples, the OT protocol can be used as the sole primitive to implement generic secure computation protocols.

In some examples, garbled circuits enable the computation of any function. In accordance with implementations of the present disclosure, garbled circuits are combined with secret shares. One resulting restriction is that each input and output (function result) must be a secret share. For example, Alice's input can be provided as a and Bob's input can be provided as b, both of which can be a secret share. The function f can be provided as a function that is to be computed using garbled circuits. The circuit can automatically be augmented using an additional input r by the circuit encryptor. The circuit computes the function f' based on the following example relationship:

$$f'(a,b,r) = f(a,b) - r$$

In this example, the circuit encryptor obtains no output from the secure computation, but uses the locally chosen additional input r as the return value. The circuit decryptor obtains the new function result f'. Accordingly, these return values constitute secret shares of the function result f(a, b), which can be subsequently used in computations using homomorphic encryptions or garbled circuits.

In some examples, secrets as inputs are automatically reconstructed at the beginning of the function. For example, $x_A$, $y_A$ and $x_B$, $y_B$ can be provided as shares of x and y, respectively. Consequently, the function $f(x, y) = x < y$ to compare x and y can be implemented based on the following example relationship:

$$f''(x_A, y_A, x_B, y_B, r) = ((x_A + x_B) < (y_A + y_B)) - r$$

As introduced above, implementations include extension of a DSPL based on the security type system of the present disclosure. For example, the L1 language is extended for mixed-protocol secure computation with using the security type system of the present disclosure. As noted above, L1 is a simplification and extension of Java that incorporates features to better support secure computation. Example L1 features include messaging support and player-specific code. Messaging support enables parties to send each other messages. In some examples, messaging support is implemented using a framework for asynchronous communication that is available to all parties. In a basic form, the send command can be invoked using the following example listing:

send (2, _var, "var_id");

Listing 1: Example Send Command

In this example, the contents of the variable "_var" are sent to the player (e.g., party) with the identifier "2" under the message name "var_id." The variable "_var" is cleared after the send command, such that it cannot be reused. This ensures that each variable is sent at most once.

In some examples, player identifiers are assigned (e.g., to the involved parties) globally in a configuration file at the start of the protocol execution. In some examples, an identifier is associated with an IP address and port number where the player's code receives messages. In some examples, message names are unique for a receiving party to avoid messages being lost due to overlapping communication. In some examples, the receiving party can receive a previously sent value using the read command. An example read command, in which the receiving part receives content under the message name "var_id" can be invoked using the following example listing:

var=read("var_id");

Listing 2: Example Send Command

In some examples code for all parties can be integrated into one program that is executed by all parties. For example, this is a design principle of the L1 language. The program is executed by all players. This corresponds to secure computation where the functionality (and the protocol) is known to all parties in advance. In some examples, player-specific (party-specific) code can be used to implement the sending and receiving of messages between the parties (using the send and read commands).

In some examples, player-specific code is only executed at a party having a specific identifier. The party's identifier is placed at the start of the statement. If no such identifier is present, the statement is executed by all parties. In this manner, the send and receive commands can be implemented within the same program. An example of this is provided in the following example listing:

send (2, var, "var_id");
   var=read ("var_id");

Listing 3: Example Message Sending and Receiving

In some examples, L1 has its own type system for basic, non-security relevant types. In some examples, L1 provides data types for multi-precision integers (int), public keys (pubk) and private keys (privk). Implementations of the present disclosure extend the L1 type system to include data types for secret shares and ciphertexts. In some examples, L1 implements copy semantics for variable assignments. Even if a complex variable (e.g., secret share, ciphertext, multi-precision integer) is assigned, the assigned value is copied onto the memory of the assigned variable. This differs from the pointer semantics of Java where only a reference is assigned.

In some implementations, a secret share type is parameterized by the modulus of the share. In some examples, only additive shares are provided, where p is the modulus and s (s<p) is the secret. In some examples, there are n (n≥2) shares $s_i$, such that:

$$\sum_{i=0}^{n-1} s_i (\mod p) = s$$

In some implementations, a secret share can be internally represented as an object containing a multi-precision integer (the value of the secret share) and a reference to a multi-precision integer (the modulus). In some examples, an integer can be implicitly converted into a secret share. In some examples, converting a secret share to an integer can require a type cast. When an expression is assigned to a secret share, a modulo operation can be automatically performed. A secret share can be declared at each party as provided in the following example listing:

int p=getModulus(pubk);
   shar<p> s;

Listing 4: Example Secret Share Declaration

In some examples, several ciphertext data types can be provided. The ciphertext data types can depend on the encryption system used. Further, for each public key encryption system there are multiple types of ciphertexts. For example, one type of ciphertext can include the player having the private key, and another type of ciphertext can include the player having only the public key. In some examples, it can be assumed that, for ciphertexts where the player has the private key, no other player can access the plaintext (that is, the private key is indeed confidential). In some examples, the ciphertext type can be parameterized with the respective (public or private) key.

By definition, a ciphertext contains a secret share as payload, and the secret share has the same modulus as the homomorphic operation in the encryption system using the specified key. In some examples, a ciphertext can be internally represented as an object containing multi-precision integers (the ciphertext value) and a reference to a key. However, and as noted above, an integer can be implicitly converted into a ciphertext, but converting a ciphertext to an integer can require a type cast. Ciphertext can be declared as provided in the following example listing:

pubk pubKey;
   cipher<pubKey> c;
   prvk privKey;
   cipher<privKey> d;

Listing 5: Example Ciphertext Declaration

Implementations of the present disclosure support garbled circuits and oblivious transfer as cryptographic protocol primitives. In some examples, garbled circuits can be implemented using a plurality of commands. An example protocol (e.g., Yao's protocol) can have a sender that encrypts (and garbles) the circuit and a receiver who decrypts the circuit after obtaining the decryption keys via oblivious transfer. In some examples, the ideal functionality to be computed in the circuit is specified as a function (e.g., in C like syntax). In some examples, each input variable is shared between both parties and is reconstructed at the beginning of the circuit. In some examples, each party inputs its shares as parameters to the command. The output can be automatically shared. The random variable r (using the modulus of the result) can be automatically appended as input to the circuit by the encryptor. n some examples, the circuit is filled with a random input chosen by the command and is returned as a result from the command. The output (the result of the circuit) can be returned as a function result to the decryptor (subtracted by the random value of the encryptor). The following example listing implements the circuit for the function $f''(x_A, y_A, x_B, y_B, r)=((x_A+x_B)<(y_A+y_B))-r$ discussed above:

share<(1<<32)>x, y;
   share<2> r;
   1: r=gcencrypt(2,
      "bool compare(int x, int y) {
         compare=x<y;
      }",
      x, y);
   2: r=gcdecrypt(1, "compare", x, y);

Listing 6: Example Garbled Circuit Protocol

In some implementations, oblivious transfer can also implemented using multiple commands: one command for sending and one command for receiving. In some examples, the sending command takes an array as parameter. A length of the array can be provided as the number of possible choices in the oblivious transfer. The input array is cleared after sending. In some examples, the receiving command takes the index as a parameter and outputs the selected message. In some examples, the communicating party is specified within the receive command, because the protocol is interactive. The following example listing provides an example 1-out-of-2 oblivious transfer:

```
1: share<p> _x*[2];
2: share<p> y;
2: int b;
1: otsend(2, "id", _x);
2: y=otread(1, "id", b);
```

Listing 7: Example Oblivious Transfer

Implementations of the secure type system of the present disclosure ensure that only freshly and independently chosen random variables are revealed to the other party. In some examples, these variables can be distinguished by typing them as untainted (versus tainted for variables during processing). Each basic data type of secret share, ciphertext or array can be tainted or untainted. In accordance with implementations of the present disclosure, re-randomization can be performed for reverse taint checking. In this manner, the untainted type of variables can be provided.

In some examples, taint checking is a programming language operation that provides tracking to determine whether inputs are processed safely. Taint checking can help prevent certain common programming errors, such as SQL injections or buffer overflows. In a taint checking mode, each variable set by an input is tainted. After certain checks have been performed (e.g. in PERL using regular expressions), the variable can be cleared as untainted. Every time a tainted variable is used in a dangerous (high-risk) operation (e.g., accessing a database), the program is aborted with a fatal error.

In accordance with implementations of the present disclosure, reverse taint checking is provided, in which a statistically verifiable, variable tracking mechanism is used, but the taint flag is set by local operations and is checked upon sending data. In some implementations, reverse taint checking includes setting each variable as either tainted or untainted. All variables assigned by expressions are tainted, because they are the result of a local computation. It does not matter whether the assignment expression is a read command, some arithmetic operation or even a constant. Every regularly assigned variable is tainted. The fundamental check is that the sending commands do not accept tainted variables as parameters. If the parameter is tainted, the program does not type check. Only untainted variables may be sent to the other parties.

In some implementations, the semantics of an untainted variable are defined as used in the security type system: an untainted variable is independently random, immutable, and is only used once. Independently random implies that it contains independently randomly distributed data. It is immutable, as it can only be set by special commands and the randomness is chosen by the system. An untainted variable can only be used once and is cleared after use in a send or re-randomization command. These properties can be summarized based on the following example definition:

Definition 1: An untainted variable is an immutable object that contains random data independent of all other untainted variables. An untainted variable can be used in a send command or a re-randomization command and is cleared after use.

In some implementations, a type-dependent re-randomization operation can be performed to create untainted variables. Re-randomization renews the randomness in a tainted variable using fresh random input. Depending on the type, different re-randomization operations can be performed. An example re-randomization operation is provided in the following example listing:

```
share<p> s;
cipher<pubKey> c;
cipher<privKey> d;
share<p> x[2];
share<p> r;
_s=rerandomize(s, r);
_c=rerandomize(c, r);
_d=rerandomize(d, null);
_x=rerandomize(x, r);
```

Listing 8: Example Re-Randomization

In accordance with implementations of the present disclosure, example re-randomization operations can include secret share, ciphertext with public key, ciphertext with private key, and array. In some examples, a secret share s is associated with a modulus p, and a fresh random number r can be uniformly selected in $\mathbb{Z}_p$. In some examples, an updated value is returned and can be provided as:

$$s \leftarrow s \leftarrow r \pmod{p}$$

and the new secret share with the value r can be copied into the randomization parameter.

In some examples, and with regard to ciphertext with public key, the ciphertext and the contained secret share are associated with the same modulus p. A fresh random number r can be uniformly selected in $\mathbb{Z}_p$. In some examples, the negation of the random number r is encrypted using the associated public key. In some examples, E(−r) denotes this encryption and c denotes the ciphertext of the re-randomized variable. In some examples, the following, updated ciphertext can be returned:

$$c \leftarrow c \cdot E(-r)$$

and the new secret share with the value r can be copied into the randomization parameter.

In some examples, and with regard to ciphertext with private key, it can be assumed that the possessor of the private key is a sole possessor. Therefore, the contained secret share cannot be accessed by any other party. In some examples, the ciphertext is re-randomized based on re-randomization of IND-CPA secure, homomorphic encryption. In some examples, d can denote this ciphertext and can be returned as:

$$d \leftarrow d \cdot E(0)$$

In this case, the randomization parameter is not used.

In some examples, and with regard to array, the randomization parameter (e.g., r, E (r), E (0)) is selected only once. The same randomization is applied to each element of the array and the randomization parameter is copied. In some examples, the return array contains the re-randomized elements. Accordingly, only the array is untainted by this operation, while each element in the array remains tainted. In this manner, the array can be used in an oblivious transfer command, while preventing the elements from being sent individually using the send command.

In some implementations, it can be necessary to choose random shares before performing an operation and sending the result. In some examples, an untainted variable is created during a re-randomization command and can be sent over the network. In some examples, instead of directly sending the untainted variable, the untainted variable can be used to re-randomize another variable. The semantics of this re-randomization operation is that the untainted input parameter is cleared after the re-randomization command (just as it is cleared after a send command), such that the untainted input parameter cannot be reused. The return variable is subsequently untainted and can be used as such. The following example listing depicts an untainted variable being used to re-randomize another variable:

```
share<p> r;
// _s=s-r
// r is set and chosen fresh
_s=rerandomize (s, r);
// _t=t-_s
// _s is used and then cleared
_t=rerandomize (t,_s);
```

Listing 9: Re-Randomization with Untainted Variable where the variable _s is null after the execution of this code.

An example complete re-randomization function is depicted in Algorithm 1 provided in FIG. 2. From Algorithm 1, it can be verified that, after re-randomization one variable, the untainted variable, is independently randomly distributed as required by Definition 1. This holds even in case of re-randomization with untainted variables.

In some examples, if all variables were only to be sent as re-randomized variables, a useful result would not be obtained. That is, every (useful) secure computation has an admissible information flow. Consequently, implementations of the present disclosure enable reconstruction of the output values from the secret shares. For example, s can be provided as a secret share that is designated as output. An output statement (e.g., in L1) can be used to declare output. However, before outputting the result to the parties result secret shares can be exchanged. Accordingly, and in some examples, the output command is restricted to secret shares as parameter. The secret share can only be sent if it is untainted. The programmer can declare that this variable is designated for output before the output is actually performed. In accordance with the following example listing, a mutual exchange of result shares can be exchanged between parties:

```
share<p> s_prime;
_s=output (s);
send (id ( ) %2+1, _s, "result_share");
s_prime=read ("result_share");
s=s+s_prime;
output ("result=", s);
```

Listing 10: Example Share Reconstruction and Output

In accordance with implementations of the present disclosure, a regular type system is augmented with a STS (see FIG. 1) where every expression carries both a type (e.g., secret share, ciphertext, array) and a security type (e.g., tainted, untainted). In some examples, the STS is provided as a collection of typing rules that describe what security type is assigned to a program (or expression), based on the types of sub-programs (sub-expressions). For example, ⊢ exp:t can be written to mean that the expression exp has security type t∈{tainted, untainted} based on the typing rules of the STS. This assertion can be referred to as a typing judgment. Similar to the construction of the STS for information flow, a security context [sc] associated with a label of a program counter can be used. In some examples, the security context to prevent the programmer from sending messages depending on the truth value of expressions with tainted variables. Untainted variables are random and are therefore not useful for branching conditions. This aspect is significant, because not only the content of a message may reveal information, but just sending of the message itself is revealing. The typing judgment [sc]⊢ C means that the program C is typable in the security context sc.

FIG. 3 presents example typing rules for a simplification of an example programming language (e.g., L1). In some examples, loops can be omitted, because loops can only have a constant number of iterations in secure computation and can therefore be unrolled. In some examples, typing rules for the regular type system can be omitted. Expression security types and security contexts can be either tainted or untainted. In some examples, a typing rule is provided as an inference rule that describes how types are assigned. For example, the statements above the line must be fulfilled for the rule to be applied, yielding the statement below the line.

With particular reference to FIG. 3, according to the example rules labeled [E-1] to [E-3], some variables (u) have security type untainted. In the example of FIG. 3, all other expressions and variables have type tainted. This includes expression which include, but are not limited to, occurrences of untainted variables. The example rules labeled [R-1] to [R-2] ensure that untainted variables can only be assigned by re-randomization and output statements, but are otherwise static.

With reference to the examples rules labeled [M-1] to [M-6], the message sending commands can only be executed in an untainted security context. Of those commands, the commands that transmit plaintext messages as payload (e.g., send, otsend) can only transmit untainted variables. In this example, received variables are always immediately tainted. The example typing rules labeled [C-1] to [C-5] control the security context in a composite program. In some examples, the commands skip and variable assignment are typable in any context. In some examples, branches must be typable in a tainted context. This is justified by the above example requirement that message sending commands may not be executed depending on tainted variables. The example typing rules labeled [C-4] and [C-5] enable composition of programs including a subsumption rule, which enables sending messages before or after a tainted context (branching). In some implementations, untainted variables are shown using an asterisk after the type declaration. Examples for a share and an untainted array are provided in Listing 7 above, and in the following example listing:

```
share<p>* _s;
share<p> _a*[2];
```

Listing 11: Example Untainted Variable Declaration

Security in the semi-honest model can be provided. In some examples, the view $VIEW^\Pi(x,y)$ of a first party during protocol Π on the first party's input x and a second party's input y includes the input x, the outcome of the first party's coin tosses and the messages received by the first party during execution of the protocol. The following example definition can be provided:

Definition 2: A protocol Π computing $f(x,y)$ is secure in the semi-honest model, if, for each party, there exists a polynomial-time simulator S given the party's input and output that is computationally indistinguishable from the party's view $VIEW^\Pi(x,y)$:

$$S(x, f(x,y)) = VIEW^\Pi(x,y)$$

The following example theorem shows that a well-typed program is compiled into a protocol secure in the semi-honest model:

Theorem 3: Let program C implement function F. Then, if C is well-typed (⊢ C), C implements F securely in the semi-honest model.

It can be shown that a simulator for each party's view can be constructed. A problem arises, however, in that the view is determined by the messages received and not the messages sent (where type safety applies). Consequently, it can be assumed that the entire protocol is written (e.g., in L1) using player-specific code. The messages received from the other party can be simulated. Because of the symmetry of the programming language, only a simulator for one party is constructed. That is, the simulator can apply to both parties.

In some examples, there is always an admissible information flow in secure computation (this is different from information flow type system). This is due to the nature of the joint computation (i.e., some result is revealed). Consequently, it is not possible to strictly distinguish between the program and the information conveyed. This can be captured using the output variables.

In some examples, the simulator can include input, coin tosses and messages received. Input can be simulated by the real input (which is given to the simulator) and coin tosses can be chosen by a random number generator (e.g., a Java RNG). This leaves the received messages to be simulated. In some examples, $m_1, \ldots, m_n$, are provided as the messages received. In some examples, the simulator can be constructed in a step-by-step manner, where, for each message received, a simulated message is added. Accordingly, an empty simulator $S_0$ can be provided, and which does nothing. A simulator $S_i$ can be constructed from a simulator $S_{i-1}$ by appending a simulation of message $m_i$ to $S_{i-1}$. Accordingly, it can be noted that the number of messages is constant:

Lemma 1: In a well-typed program (⊢ C) the number of sending statements (send, otsend, gcencrypt) is constant.

It can be note that no sending statement may appear inside a branching statement.

A simulated message can be constructed for each message $m_i$ received. In some examples, oblivious transfer and Yao's protocol can be simulated as an oracle transmitting only the resulting messages, as long as proven secure in the semi-honest model. In some examples, only the resulting messages are simulated.

In some implementations, there are two types of messages received: output messages and intermediate messages. In some examples, output messages include messages that are marked as output by the other party. For example, $m_i$ can be a received output message. In a correctly implemented program, these messages are indeed output at the local party (after combination with a local share). Therefore, the local party can simulate the message as follows: o is provided as the output that is given to the simulator and/is provided as the local share for reconstructing output, where local share/can be computed from the local state of the party up to that point in the program. Accordingly, the message can be simulated as:

$$m_i = o - l \pmod{p}$$

In some examples, intermediate messages are provided as messages that are re-randomized by the other party. For example, $m_i$ can be provided as an intermediate message that is received. In a well-typed program, these messages are all randomly independently distributed.

Lemma 2: In a well-typed program all re-randomized variables are independently randomly distributed.

This follows directly from the construction of re-randomization.

In some examples, after the algorithm of re-randomization is executed (see Algorithm 1 of FIG. 2), only one untainted variable is assigned. This variable is always independently randomly distributed. Consequently, the set of re-randomized variables is always a set of independently randomly distributed variables. It can be noted that local and output variables can be dependent on the re-randomized variables.

The received message $m_i$ can be simulated as an independent random variable depending on the type of the message (e.g., secret share or public-key ciphertext) in view of the following example relationship:

$$m_i \leftarrow_R \mathbb{Z}_p / E(\mathbb{Z}_p)$$

This completes the simulator—all messages can be simulated—and consequently the proof of semi-honest security.

Implementations of the present disclosure are further discussed by way of examples. The examples include multiplication and sub-string creation. It is appreciated, however, that implementations of the present disclosure can be equally applicable in other contexts.

With regard to example multiplication, the multiplication protocol can be provided using homomorphic encryption and secret shares (see example multiplication protocol provided above). This multiplication protocol shows that, using the typed language in accordance with implementations of the present disclosure, any functionality can be implemented securely. An example listing (Listing 12) for secure multiplication is provided in FIG. 4.

With reference to FIG. 4, the encrypt command (lines 33-34) returns a tainted variable. Subsequently, the ciphertext is re-randomized (with known private key) (lines 35-36). This may seem superfluous, because the randomness is fresh during encryption, but the contained share may be tainted in ciphertexts with the public key only. This re-randomization approach can be provided over a polymorphic command based on return type. In line 47 of the example listing of FIG. 4, it is shown that using the rerandomize command, explicitly adding a random variable can be omitted. Instead, the randomness introduced by the re-randomization command can be used.

With regard to sub-string creation, an example sub-string creation protocol can use all of the primitives discussed herein: Yao's garbled circuits, oblivious transfer, secret shares and homomorphic encryption. In some examples, the security proof of the example sub-string creation protocol is not obvious, such that a well-typed implementation underpins its provable security. In some examples, the example sub-string creation protocol operates on strings. In some examples, a string includes a length field and a fixed-length array of characters. Each string is secretly shared between Alice and Bob, such that neither Alice nor Bob know its contents or even length.

In some examples, the purpose of the sub-string creation protocol is to create a substring of length t of a string x starting at position t. The resulting substring will also be secretly shared—just as the inputs. That is, there is no output reconstruction. In some examples, the sub-string creation protocol starts with a rotation of the shared string to the left by s characters. In some examples, the trailing characters beyond the length field are masked, such that they are all set to 0 again. In some examples, each share of the string is masked separately, such that the masking protocol is executed twice with the roles reversed. The composed main protocol is shown in the example listing (Listing 13) of FIG. 5.

The types for strings (containing length field and array) are defined in the example listing (Listing 18) shown in FIG. 6. This header of the protocol also loads the cryptographic keys for the homomorphic encryption. Both a private, public key-pair and a public key (of the other party) are read from memory. In this example protocol, Naccache-Stern encryption is used, because the modulus of the homomorphic operation must be the same at both parties. In some examples, a fixed modulus of 256 is used in order to simplify integration with Yao's protocol.

The example listing (Listing 19) of FIG. 7 provides helper functions for adding (secret shares of) and rotating strings. Further, the example listing (Listing 20) of FIG. 8 provides re-randomization functions for the different string types, and the example listings FIGS. 9 and 10, respectively, provide encryption and decryption functions (Listing 21) and message sending functions (Listing 22). It can be noted that the message sending and receiving functions use send and read commands inside for loops. This is allowed, because the number of iterations of the for loop is constant and is therefore automatically unrolled in the compiler. This significantly simplifies programming, since each array element does not need to be explicitly sent.

The example listing (Listing 14) of FIG. 11 provides an example complete rotation protocol. The example rotation protocol rotates the string, such that the initial character is at position 0. In some examples, this is achieved using the following technique: each share is encrypted and sent to the other parties, which then rotates it by its share of the initial position. The rotation protocol re-randomizes the share and returns the share before the share is rotated by the local share of the initial position. This can require a particular interlocking technique. For example, before Alice can send her share to Bob, Alice needs to re-randomize the share with the re-randomization values for Bob's share (these will cancel out). Alice cannot do this after receiving the returned ciphertexts from Bob, because they are then already rotated. Therefore, in order to implement the example rotation protocol, Alice needs to choose the re-randomization parameters for Bob's share before she sends her share. In some examples, this can be achieved by re-randomization using untainted variables created in a rerandomize_shift function, an example of which is provided in the example listing (Listing 15) of FIG. 12. This example function creates an untainted variable containing a random share that is already rotated by the local share of the initial position.

In the provided example, the entire sub-string creation protocol is implemented in one function where each party's code is implemented using player-specific code. In some examples, the sub-string creation protocol is implemented as such, because both sides of the protocol are asymmetric. For example, in line 11 of Listing 14 of FIG. 11, there is the call of the initial re-randomization creating the untainted variable. This untainted variable is then used for re-randomization in line 31 of Listing 14 of FIG. 11 completing the interlock technique. Bob can simply add his re-randomization to his share in line 20 of Listing 14 of FIG. 11.

The masking protocol creates a 0, 1 encrypted string, which is used to mask the local share. In some examples, care should be taken, if the shares of the length of the substring wrap around the modulus. In some examples, two cases need to be prepared: one in which the shares of the length of the substring wrap around the modulus and one in which the shares of the length of the substring do not wrap around. The correct one is chosen by oblivious transfer. The condition is computed by a comparison implemented as a Yao's protocol. In some examples, the masking protocol is executed twice with roles reversed. Consequently, each side of the sub-string creation protocol is implemented as a separate function. The example listing (Listing 16) of FIG. 13 shows one side and the example listing (Listing 17) of FIG. 14 shows the other side. Then each side is called with the local input in the composed protocol (see Listing 13 lines 6-9 of FIG. 5).

Figure 15:
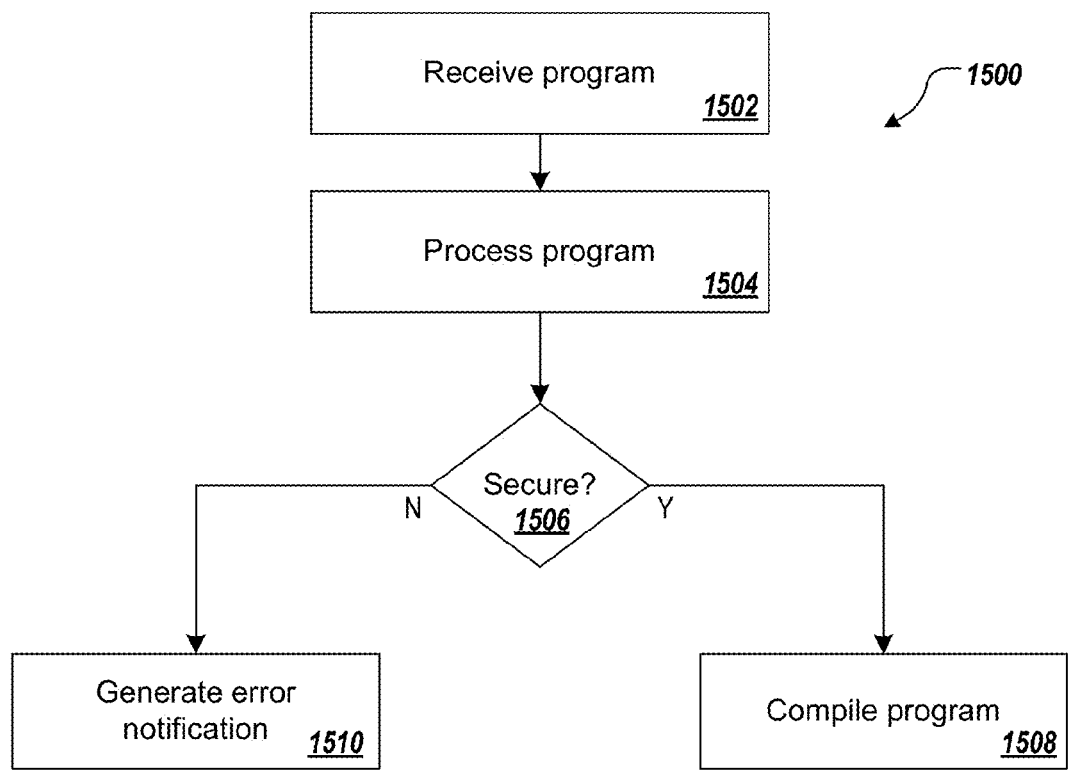
FIG. 15 is a flowchart illustrating an example process that can be executed in implementations of the present disclosure.

FIG. 15 is a flowchart illustrating an example process 1500 that can be executed for checking that a to-be-compiled program is well-typed such that the program is secure in a semi-honest model. The process 1500 can be provided by one or more computer programs that are executed using one or more computing devices.

A program is received (1502). In some examples, the program is provided in a human-readable, domain-specific programming language and includes two or more protocols to provide secure computation based on inputs provided by two or more parties. In some examples, the program is provided as an electronic document that can be stored in computer-readable memory and that can be processed by one or more processors. The program is processed in view of a type system to determine whether the program is secure in the semi-honest model (1504). In some examples, the type system includes a secure type system extension that is provided as a set of typing rules that describe security types that can be assigned to one or more entities of the program. In some examples, the type system is provided as an electronic document that can be stored in computer-readable memory and that can be processed by one or more processors.

It is determined whether the program is secure in the semi-honest model (1506). If the program is secure, the program is compiled (1508). In some examples, the program is compiled to generate a machine-readable, computer-executable program. If the program is not secure, an error notification can be generated (1510). In some examples, the error notification notifies the programmer that an error is present within the program that results in the program being insecure. In some examples, the error notification specifies one or more portions of the program that have resulted in the error. In some examples, the programmer can revise the program and can re-submit the program for compilation.

Figure 16:
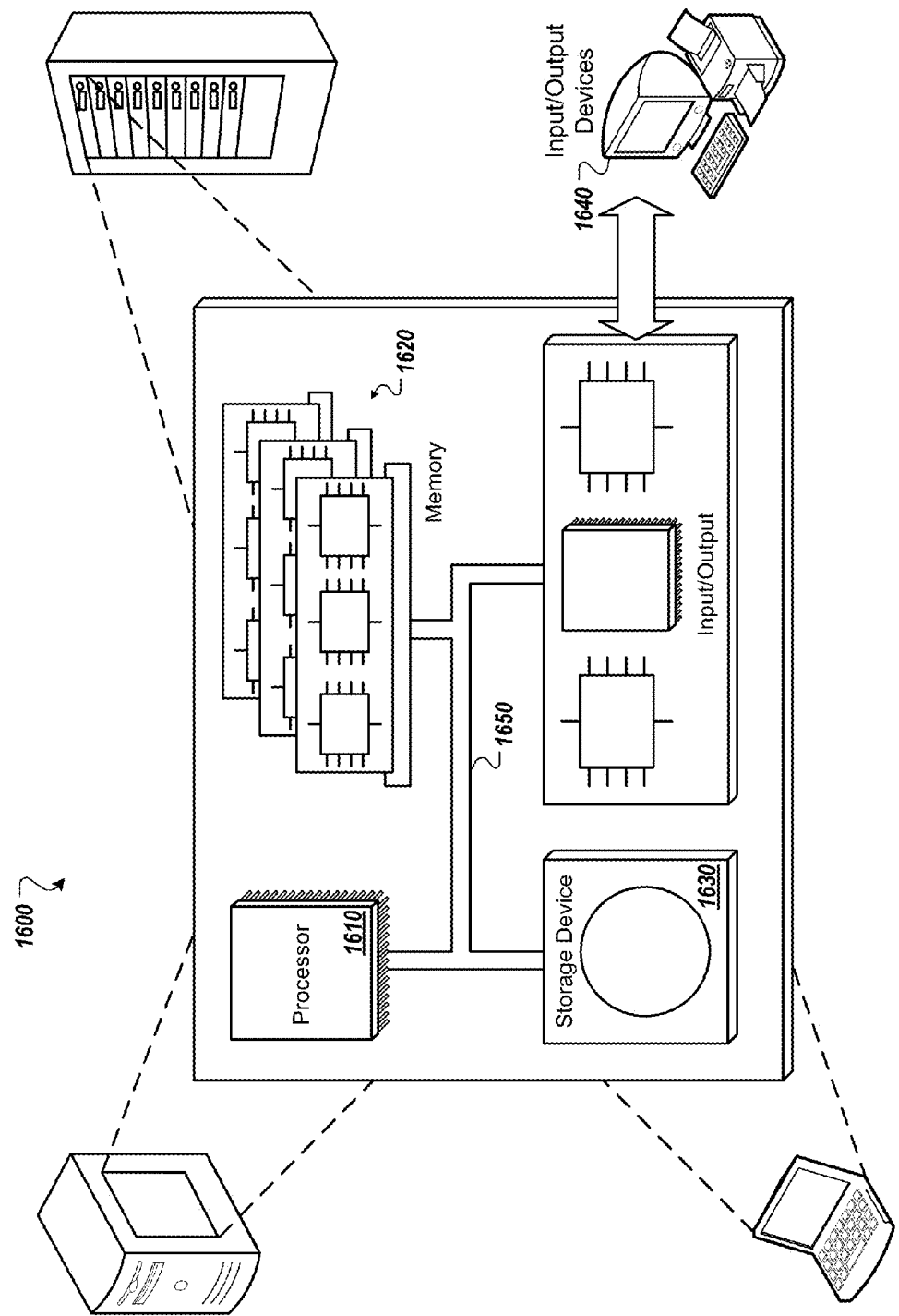
FIG. 16 is a schematic illustration of example computer systems that can be used to execute implementations of the present disclosure.

Referring now to FIG. 16, a schematic diagram of an example computing system 1600 is provided. The system 1600 can be used for the operations described in association with the implementations described herein. For example, the system 1600 may be included in any or all of the server components discussed herein. The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit. The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device. The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for checking that a to-be-compiled program is well-typed such that the program is secure in a semi-honest model, the method being executed by one or more processors and comprising:
   receiving, by the one or more hardware processors, the program, the program being provided in a human-readable, domain-specific programming language and comprising two or more protocols to provide secure computation based on inputs provided by two or more parties;
   processing, by the one or more processors, the program in view of a type system to determine whether the program is secure in the semi-honest model, the type system comprising a secure type system extension provided as a set of typing rules that describe security types that can be assigned to one or more entities of the program; and
   compiling, by the one or more processors, the program to generate a computer-executable program in response to determining that the program is secure in the semi-honest model.

2. The method of claim 1, wherein each entity comprises one of a variable and an expression.

3. The method of claim 1, wherein the security type system extends functionality of the type system to ensure that execution of the computer-executable program is secure.

4. The method of claim 1, wherein processing the program comprises assigning a type and a security type to each entity provided in the program.

5. The method of claim 4, wherein the security types comprise tainted and untainted, and wherein an untainted entity is provided as an immutable object that contains random data that is independent of any other untainted entity.

6. The method of claim 5, wherein an untainted entity can be used in one of a send command and a re-randomization command of the program and is cleared after use.

7. The method of claim 1, wherein each typing rule is provided as an inference rule that describes how a security type is assigned to an entity.

8. The method of claim 1, wherein the set of typing rules provides that a particular variable is untainted and that all other variables and expressions are tainted.

9. The method of claim 1, wherein the set of typing rules ensure that untainted variables can only be assigned by re-randomization and output statements of the program.

10. The method of claim 1, wherein the set of typing rules ensure that message sending commands of the program can only be executed in an untainted security context.

11. The method of claim 1, wherein the program implements one or more functions, and processing the program ensures that execution of each function of the one or more functions is secure in the semi-honest model.

12. The method of claim 1, wherein a protocol of the program computes a function based on a plurality of inputs and is secure in the semi-honest model, if, for each party of the two or more parties, a polynomial-time simulator is provided that, given one party's input and a resulting output of the program, is computationally indistinguishable from another party's view.

13. The method of claim 1, wherein the type system associates data types to each value that is to be computed in the program and ensures that the program provides no type errors.

14. A non-transitory computer-readable medium coupled to the one or more computers having instructions stored thereon which, when executed by the one or more computers, cause the one or more computers to perform operations for checking that a to-be-compiled program is well-typed such that the program is secure in a semi-honest model, the operations comprising:

receiving the program, the program being provided in a human-readable, domain-specific programming language and comprising two or more protocols to provide secure computation based on inputs provided by two or more parties;

processing the program in view of a type system to determine whether the program is secure in the semi-honest model, the type system comprising a secure type system extension provided as a set of typing rules that describe security types that can be assigned to one or more entities of the program; and compiling the program to generate a computer-executable program in response to determining that the program is secure in the semi-honest model.

15. A system for sharing data in a supply chain, the data corresponding to an item having a tag associated therewith, the system comprising:

one or more hardware computers; and a computer-readable medium coupled to the one or more computers having instructions stored thereon which, when executed by the one or more computers, cause the one or more computers to perform operations for checking that a to-be-compiled program is well-typed such that the program is secure in a semi-honest model, the operations comprising:

receiving the program, the program being provided in a human-readable, domain-specific programming language and comprising two or more protocols to provide secure computation based on inputs provided by two or more parties;

processing the program in view of a type system to determine whether the program is secure in the semi-honest model, the type system comprising a secure type system extension provided as a set of typing rules that describe security types that can be assigned to one or more entities of the program; and compiling the program to generate a computer-executable program in response to determining that the program is secure in the semi-honest model.

* * * * *